United States Patent Office 3,641,247
Patented Feb. 8, 1972

3,641,247
METHODS OF TREATING BACTERIAL INFECTIONS
Elton S. Cook, Cincinnati, Ohio, and Norbert J. Berberich, Jr., Burlington, Ky., assignors to Stanley Drug Products, Inc., Portland, Oreg.
No Drawing. Original application Mar. 4, 1968, Ser. No. 709,937. Divided and this application Dec. 14, 1970, Ser. No. 98,138
Int. Cl. A61k 27/00
U.S. Cl. 424—211       5 Claims

ABSTRACT OF THE DISCLOSURE

A variety of substances are reported which alter host resistance to cocci bacterial infections. Nevertheless drugs which induce a high degree of resistance to these infections when administered prophylactically are not in wide use. Drugs which confer immunity to these infections for more than a week after administration are virtually unknown. Antimicrobials have been found which are effective in inducing resistance to infections due to cocci when administered prophylactically.

BACKGROUND OF THE INVENTION

This application is a division of our application Ser. No. 709,937 filed Mar. 4, 1968.

This invention pertains to antimicrobials. In a particular aspect the invention relates to antimicrobials effective in protecting against cocci bacterial infections.

Bacteria such as cocci are a unique group of organisms embodying within themselves an array of yet unanswered puzzles in biology, both fundamental and experimental. They are ubiquitous in distribution and have attained extreme degrees of diversification in biological and biochemical characteristics. It is recognized that the significance of staphylococcal infections is not so much in severity, except in a few instances, as in the subtleties of the infection due to the unpredictable vagaries of these organisms.

Treatment of cocci bacterial diseases is complicated by the ability of the organisms to develop resistance. The magnitude of the problem is further amplified by the extreme difficulty of total eradication, and the frequent reappearance of the same strain even after apparently successful elimination. The inability to eliminate the carrier state by any of the currently known methods and the prevalence of the new antibiotic resistant hospital strains have added a new dimensions to the frustrating situation.

Penicillin G (benzyl penicillin) is still the drug of choice for the treatment of infections caused by susceptible coccic strains. However numerous strains are known which elaborate enzymes such as penicillinase in response to the drugs and thus remain insensitive. This led to the development of semisynthetic penicillins which are not inactivated by penicillinase. However, recently resistance of staphylococci to the newer penicillins has been reported. Hence, there is a seemingly never ending demand for anticoccic and anti-bacillic factors.

A variety of substances are reported which alter host resistance to cocci infections. However, drugs which induce a high degree of resistance to coccic infections when administered prophylactically are not in wide use. Significantly the drugs which confer immunity to coccic infections for more than a week after administration are virtually unknown. This invention provides an antimicrobial which not only expresses its anticoccic properties one hour after administration but which confers immunity to staphylococcal infections up to four weeks after administration. Even more remarkably an injection after treatment gives complete immunity to reinfection up to at least two months.

SUMMARY OF THE INVENTION

In accordance with the practice of this invention a new antimicrobial is provided conferring remarkable resistance to coccus infections. The treatment of the problem is unique in that vaccine-type compositions have been developed as a solution. The approach is prophylactic rather than therapeutic. The invention thus provides an antimicrobial effective in inducing resistance to bacterial infections when administered prophylactically, yet without itself being live, a sphingolipid. The sphingolipid is either phrenosin or sphingomyelin.

DETAILED DESCRIPTION OF THE INVENTION

The processes of infection leading to disease are accepted to be a problem in the ecology of the parasite. It is being increasingly realized that the bacterial and host determinants are closely interrelated. Staphylococcal virulence derives from the combined action of several bacterial factors whose effectiveness is conditioned by the reactions of the host. Perhaps the most striking feature of hostparasite relationships in staphylococcal infections is the relatively atypical immunologic response. Human studies have given convincing evidence that most adult humans possess an array of anti-staphylococcal antibodies. Nevertheless, resistance to staphylococci seems to be governed to a considerable extent by other unrelated factors. For this reason attempts at prophylactic administration have not been completely successful.

In vitro experiments performed to study the effects on the best known characteristics of *Staphylococcus aureaus* of the two sphingolipids concerned herein led to the conclusion that the sphingolipids contemplated do not alter the biochemical characteristics of the organism. This is very significant indeed. It means that in the true sense these compounds are not antibiotics. Antibiotics are somewhat poisonous, being more poisonous toward the organism than toward the host. The in vitro tests showed that these compounds do not kill the organisms. However, quite surpringly, in the system of the host they create an environment in which the organism apparently cannot grow. Thus they unexpectedly render immunity to the host, but without the organism itself being present as it is in vaccines. The compositions of this invention thus constitute a significant new class of antimicrobials. It is contemplated that they will be taken orally periodically like vitamins, or by intramuscular injection, or, say, 250 mg. per day dose, based on the chemical per se, oral administration desirably being one 400 mg. tablet or pill per day. An advantage of the invention is that prior to periods where contact with staphylococci infections are more likely, such as prior to entering a hospital, injections or tablets will be used by the physician.

The high degree of resistance to staphylococcal infections obtained by the prophylactic administration of these sphingolipids will best be apparent from their biological effects in in vivo studies. Since both phrenosin and sphingomyelin are known, and are commercially available compounds, their preparation need not be described herein. Sphingomyelin and phrenosin are relatively insoluble in water, but they were emulsified by warming gently and shaking vigorously.

Throughout the course of these studies C3H, and Swiss albino mice, both male and female, were used. The animals were between 10 and 30 weeks old and had an approximate average weight of 20 to 25 grams. These animals were mostly raised and maintained on the Rockland diet.

The assays were conducted using a penicillin-resistant strain, *Staphylococcus aureus* Original, first isolated from a case of acute tonsilitis and maintained in our laboratories for years. This strain is preserved in the lyophilized form and stored at O+C. and stock cultures were raised on SA 110 slants once in every 6 months. For testing, the inoculum was prepared from 24 hour cultures on SA 110 slants at 37° C. The cells were washed and suspended in physiological saline (TC Tyrode Solution, Difco). In contrast to conventional procedures, an LD 80–90 instead of LD 50 was used in these investigations. This has been the practice in our laboratories in studies with staphylococci since lower dosages often fail to give adequate degrees of mortality. The LD 80–90 was determined by injecting groups of mice subcutaneously with different dilutions of the bacterial suspension and noting the mortality over a 5-day period.

Using six groups of C3H/HeJ female mice ranging in age from 10 to 11 weeks, a biological assay of sphingomyelin was conducted. The animals were inoculated subcutaneously for three consecutive days with various amounts of sphingomyelin. On the fourth day they were challenged with a suspension of the "Original Strain" organism giving a 60 percent transmission. The results recorded in Table 1 were noted.

TABLE 1
Sphingomyelin, prophylactic, subcutaneous

| Group | Dose per animal in mg. | Percent mortality, post challenge, in— | | | | |
|---|---|---|---|---|---|---|
| | | 24 hrs. | 48 hrs. | 72 hrs. | 96 hrs. | 120 hrs. |
| Control | | 10 | 30 | 60 | 80 | 80 |
| Sphingomyelin | 10 | 0 | 0 | 0 | 0 | 0 |
| Do | 5 | 0 | 0 | 0 | 0 | 0 |
| Do | 1 | 0 | 10 | 10 | 10 | 10 |

When challenged with suspension of the "Original Strain" giving 55 percent transmission, the results in Table 2 were obtained.

TABLE 2
Sphingomyelin, prophylactic, subcutaneous

| Group | Dose per animal in mg. | Percent mortality, post-challenge, in— | | | | |
|---|---|---|---|---|---|---|
| | | 24 hrs. | 48 hrs. | 72 hrs. | 96 hrs. | 120 hrs. |
| Control | | 60 | 80 | 80 | 80 | 80 |
| Sphingomyelin | 8 | 0 | 0 | 0 | 0 | 0 |

These results demonstrate that sphingomyelin has considerable activity in offsetting the lethal effects of staphylococcal infection. To compare sphingomyelin with phrenosin the following is given, Swiss albino mice being used.

TABLE 3
Sphingomyelin and phrenosin, prophylactic, subcutaneous

| Group | Dose per animal in mg. | No. of animals | Percent mortality, post-challenge in— | | | | |
|---|---|---|---|---|---|---|---|
| | | | 1 day | 2 days | 3 days | 4 days | 5 days |
| Control | | 10 | 50 | 50 | 60 | 60 | 60 |
| Sphingomyelin | 5 | 10 | 20 | 30 | 40 | 40 | 50 |
| Phrenosin | 5 | 10 | 20 | 40 | 40 | 50 | 50 |
| Control | | 10 | 50 | 70 | 80 | 80 | 90 |
| Sphingomyelin | 5 | 10 | 30 | 40 | 70 | 70 | 80 |
| Phrenosin | 5 | 10 | 10 | 30 | 40 | 40 | 40 |

These data not only illustrate the definite value of phrenosin in protecting Swiss albino mice against experimental staphylococcal infections, but show that phrenosin is even more effective than sphingomyelin.

It was decided to assay these compounds in different mouse strains to ascertain whether discrepancies in results would appear on the basis of host differences. Assays were conducted on C3H females using sphingomyelin and phrenosin in a three-day prophylactic series. Table 4 shows the results of these runs.

TABLE 4
Sphingomyelin and phrenosin in C3H mice, prophylactic

| Group | Dose per animal in mg. | No. of animals | Percent mortality, post-challenge in— | | | | |
|---|---|---|---|---|---|---|---|
| | | | 1 day | 2 days | 3 days | 4 days | 5 days |
| Control | | 10 | 70 | 100 | 100 | 100 | 100 |
| Sphingomyelin | 5 | 10 | 20 | 40 | 40 | 40 | 40 |
| Phrenosin | 5 | 10 | 70 | 70 | 70 | 70 | 70 |

These studies show that host differences influence to some degree the in vivo activity of the compounds assayed.

In view of the relatively frequent recurrence of staphylococcal infections, it is generally thought that immunity to this organism is short-lived or only partial. It was, therefore, of interest to see if the survivors from groups subjected to lethal doses are immune after prophylactic administration to rechallenge. Survivors were from the groups which had been treated with sphingomyelin and phrenosin. Brain extract was also included in this work in order to obtain a comparative picture.

The survivors after the first challenge in the respective groups were maintained under ideal conditions, and after appropriate intervals they were rechallenged with the lethal dose of Staphylococcus aureus. Fresh control groups were employed each time. Mortality in each group was taken as an index of relative resistance or susceptibility as the case may be. Essentially the same results were obtained in several of the runs. The results of one such assay, reproduced in Table 5, are representative of these runs. In this particular case, the animals were raised on an experimental diet and were rechallenged fifty-nine days after the first challenge.

TABLE 5
Survivors rechallenged 59 days after the first challenge

| Group | No. of animals | Percent mortality, post-challenge in— | | | | |
|---|---|---|---|---|---|---|
| | | 1 day | 2 days | 3 days | 4 days | 5 days |
| Control | 10 | 100 | 100 | 100 | 100 | 100 |
| Survivors from brain extract | 7 | 14.2 | 14.2 | 14.2 | 14.2 | 14.2 |
| Survivors from sphingomyelin | 5 | 0 | 0 | 0 | 0 | 0 |
| Survivors from phrenosin | 5 | 0 | 0 | 0 | 0 | 0 |

Table 6 represents the results of similar studies with the exception that the animals were those on a commercial diet. Animals which survived the first challenge following treatment with phrenosin were rechallenged 41 days after this first challenge using a control group for comparison.

TABLE 6
Survivors rechallenged 41 days after the first challenge

| Group | No. of animals | Percent mortality, post-challenge in— | | | | |
|---|---|---|---|---|---|---|
| | | 1 day | 2 days | 3 days | 4 days | 5 days |
| Control | 10 | 80 | 90 | 90 | 90 | 90 |
| Survivors from phrenosin | 5 | 0 | 0 | 0 | 0 | 0 |

These rechallenge experiments were performed at varying intervals after the first challenge up to a maximum of 59 days and it was consistently observed that irrespective of the treatment prior to challenge, the survivors showed almost complete immunity at least up to the periods covered in our experiments.

The compositions of this invention thus constitute a significant new class of antimicrobials. It is contemplated that they will be taken orally periodically like vitamins, say, weekly or monthly, in 250 to 500 milligram tablets. Prior to periods where contact with staphylococci or streptococci infections are more likely, such as prior to entering a hospital, injections of say 150 to 500 mg. will be used by the physician. The sphingolipid can be combined with an aqueous, vegetable oil, monoglyceride or diglyceride vehicle for injection, sodium chloride being used if necessary to render the solution isotonic. The suspension or solution will contain 0.1 to 5 percent, preferably 0.1 to 1.5 percent of the sphingolipid by weight.

In the case of tablets, if desired, suitable colorants, adhesives, and lubricants will be incorporated along with a solid pharmaceutical diluent, for instance, starches, lactose, sucrose and other pharmaceutical diluents. These tablets will contain 20 percent 50 percent of the sphingolipid. Capsules can also be made. Thus, a process is provided for the control of infections in humans and other mammals due to cocci and bacilli which involves administering to the mammal a prophylactically effective amount of the sphingolipid. Various diluents, doses, and other variations and modifications will occur to those skilled in the art. Such ramifications are deemed to be within the scope of this invention.

What is claimed is:
1. A method of treating bacterial infections in mammals comprising administering to a mammal suffering from said bacterial infection an antibacterial effective amount of sphingomyelin.
2. The process of claim 1 wherein the bacterial infection is due to a coccus.
3. The process of claim 2 wherein the coccus is *Staphylococcus aureus*.
4. The process of claim 1 wherein the sphingomyelin is in admixture with a solid pharmaceutical diluent.
5. The process of claim 1 wherein the sphingomyelin is in the form of an aqueous suspension.

References Cited

Merck Index, 8th edition, Merck & Co. Inc., 1968, pp. 974 and 975.

JEROME D. GOLDBERG, Primary Examiner